United States Patent [19]
Butterworth

[11] Patent Number: 6,099,067
[45] Date of Patent: Aug. 8, 2000

[54] VEHICLE TRANSPORT COVER

[76] Inventor: Alice M. Butterworth, 2025 W. Maplewood Dr., Marion, Ind. 46952

[21] Appl. No.: 09/276,375

[22] Filed: Mar. 25, 1999

[51] Int. Cl.$^7$ ....................................................... B60J 11/00
[52] U.S. Cl. ............................................................. 296/136
[58] Field of Search ............................................. 296/136

[56] References Cited

U.S. PATENT DOCUMENTS

| | | | |
|---|---|---|---|
| 4,807,922 | 2/1989 | Glover | 296/136 |
| 4,856,842 | 8/1989 | Ross et al. | 296/136 |
| 4,938,522 | 7/1990 | Herron et al. | 296/136 |
| 4,940,276 | 7/1990 | Madison | 296/136 |
| 4,973,100 | 11/1990 | Yang | 296/136 |
| 5,086,988 | 2/1992 | LaPoint et al. | 242/96 |
| 5,112,098 | 5/1992 | Lichtmann | 296/136 |
| 5,364,155 | 11/1994 | Kuwahara et al. | 296/136 |
| 5,497,819 | 3/1996 | Chiang | 150/166 |
| 5,791,361 | 8/1998 | Chong | 135/88.01 |
| 5,845,958 | 12/1998 | Stasys et al. | 296/136 |
| 5,855,406 | 1/1999 | Vargo | 296/136 |

OTHER PUBLICATIONS

Vehicle transport cover by Budge Company, photographs marked as Figs. 1–8.
Vehicle transport covering, photographs marked as Figs. 9–16.
Miscellaneous publication entitled "New Car Delivery."
Promotional brochure entitled "Transhield," Transhield, Inc.
Selected pages of autoaccessory.com web site.

*Primary Examiner*—Gary C Hoge
*Attorney, Agent, or Firm*—Baker & Daniels

[57] ABSTRACT

A vehicle transport cover that protectively overlays the painted exterior surfaces of a vehicle. The cover includes a base sheet made of a moisture-resistant material that overlays the vehicle. An elastic strip that circumferentially extends along the vehicle encircling bottom edge of the base sheet holds the vehicle cover in place and ensures a tight fit over the vehicle. Openings provided in the base sheet and which overlay all of the vehicle windows are covered by transparent window sheets that promote driver visibility. A zippered slit is also provided in the cover along the base sheet region which is aligned over the driver-side door to allow easy access to and from the driver seat when the cover is arranged over the vehicle.

23 Claims, 10 Drawing Sheets

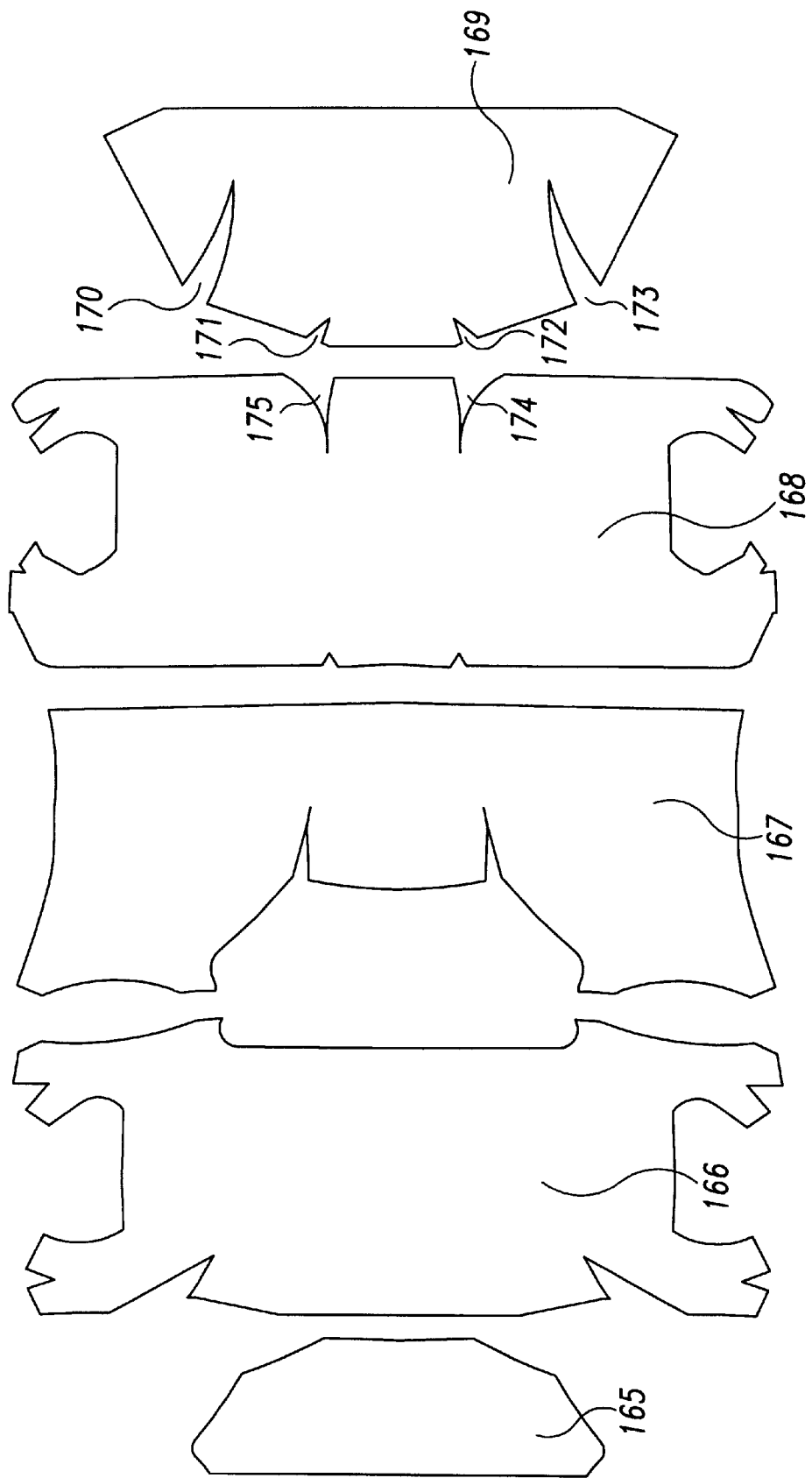

VEHICLE TRANSPORT COVER

BACKGROUND OF THE INVENTION

The present invention pertains to covers for vehicles such as automobiles and sport utility vehicles, and, in particular, to a cover for use during vehicle transport which overlays finished surfaces of the vehicle to provide protection from damage.

One problem faced by the vehicle manufacturing industry is that during transport or shipment between different locations, new vehicles are typically subjected to a variety of conditions that can damage the finish of the vehicles. For example, new paint on a vehicle often continues to cure after the vehicle leaves the factory and should do so in a clean and protected environment to avoid blemishes from occurring during the curing process. However, such an environment is absent during transport, as a variety of environmental pollutants that can harm the painted surface and to which the vehicle may be exposed include industrial fallout, acid rain, smoke, soot, oil, bird droppings, sand, tar, ultraviolet sunlight degradation, salty ocean spray and swarf. Still further, abrasive objects, including such things as watches of handlers of the vehicles, that are inadvertently brushed against the painted exterior can also cause unsightly scratches. All of these damages can lead to a vehicle with a marred appearance reaching the customer, as well as possibly undesirable and costly repairs.

While the need to protect the finish during transport is receiving attention in the industry, one reality that needs to be factored into possible solutions to this transport problem is that the transport process may require many entries into and exits from the vehicle being moved. For example, a transport schedule involving exports may include the vehicle being driven in sequence from the assembly line to a holding lot, from the holding lot to a transport carrier, from the transport carrier to a dock, from the dock to a ship transport, from the ship to a carrier transport, and so on until the vehicle ultimately reaches the retail destination.

Manufacturers have attempted to solve this transport problem and thereby provide finish protection since at least as early as 1918, when padded hardware stick frames were attached to vehicles and covered with cloth. Numerous other vehicle coatings have been tried over subsequent years, but have met with only limited success. For example, one recent attempted solution involved styrofoam strips being fastened to the doors of new automobiles, which strips were intended to prevent accidental bumping and marring from occurring during transport handling. In another attempted solution, a plastic sheeting film was applied to the hood and various portions of the side panels of trucks. Unfortunately, these styrofoam strips and plastic sheeting film only covered strategic points along the vehicle exterior, and consequently many other body panel surfaces were left unprotected from the adverse effects of environmental pollutants. Still further, the plastic sheeting film may be expensive to procure, and further its application and removal may be costly in terms of labor costs.

Another recent attempt to provide painted surface protection during transport resulted in a larger, more full-body cover that overlays the vehicle. This existing cover, which is made from a moisture-resistant fabric, has a top part that covers the vehicle roof and side portions and front and back portions that hang down to basically cover the sides, front and back of the vehicle, respectively. Headlight and taillight covering openings in the cover are covered by correspondingly shaped clear plastic sheets that are attached via adhesive along their perimeters to the cover. While some vehicle finish protection is achieved, unfortunately this prior art cover suffers from numerous shortcomings.

For instance, the means of attachment to the vehicle are complicated and time consuming to implement. While the rear bumper covering region of this cover is provided with elastic, the more reliable aspect of cover attachment is achieved with long straps that extend from one side covering portion to traverse the undercarriage of the vehicle, and engage plastic buckles along the other side covering portion to be manually pulled tight. Cross-straps with buckles that hold onto the windshield wiper blades are also furnished. In addition, and to cooperate with strips of Velcro fasteners sewn or adhered along the bottom edge of the cover, strips of adhesive-backed Velcro fasteners must be adhered to the underside of the running board/rocker panel at the vehicle sides. Similarly, rectangular pieces of Velcro fasteners sewn or adhered along the bottom edge of the cover cooperate with rectangles of adhesive-backed Velcro fasteners that during installation are adhered to the wheel wells. Due to the type and number of fasteners employed, not only is cover mounting time consuming, but in many applications the cover achieves a relatively loose fitting with many gaps through which undesirable pollutants can enter under the cover and contact the vehicle painted surfaces.

Another shortcoming of this prior art cover is related to the access panel it provides to allow a person to enter the driver's seat while the vehicle is covered. Along the edge of the access panel which extends vertically along the door rear edge and forward and downward along the door top edge, a one-inch wide Velcro strip is adhesively attached during manufacture. During cover installation, this Velcro strip on the access panel is meshable with a two-inch wide mating Velcro strip adhered to a cover portion overlapped by the edge of the door access panel to "close" the panel over the vehicle door. Unfortunately, properly matching approximately seven feet of paired Velcro to ensure a gapless connection that bars contaminant entry may be difficult to do consistently. Furthermore, when the vehicle front door is pulled open, on occasion the narrow strip of Velcro on the access panel comes unglued, forcing the operator to stop to first reattach the unglued strip and then match them again correctly. The inconsistent results of this door panel closure can allow leakage of moisture and contaminants underneath the cover, and the tedious fastening job is time-consuming and therefore expensive in terms of personal costs.

Still another shortcoming of this prior art cover is that it greatly limits the visibility of a person driving a covered vehicle during transport. The outside mirrors are completely covered with tubes or sock-like cylinders, open at the ends, arranged over cover apertures though which the mirror extends during cover installation. In addition to the fact that these open ends permit contaminants to reach the vehicle body, because the outside mirrors are obscured by these tubes the driver cannot use them to view hazards that exist behind or along the vehicle's sides when backing up is being considered. Furthermore, the prior art cover overlays some of the vehicle windows to preclude meaningful visibility therethrough. Specifically, while the prior art cover includes openings overlaying the windows of the front, rear and right sides of the vehicle for visibility purposes, the cover over the driver's door window is typically provided with only an approximately five-inch diameter circular peephole, and the other windows on the driver's side are covered, thereby resulting in large blind spots existing to the left of the vehicle. Another disadvantage related to these window openings is that in order to reduce contaminant entry under the cover, the cover edges that define these window openings are taped down to the windows with clear tape to seal the window cutouts. However, this taping process is tedious, as well as costly due to the expense of the tape and the labor costs associated with taping. Moreover, when the prior art cover is removed from the vehicle, the tape tends to shred the fabric which may render the cover nonreuseable.

Thus, it would be desirable to provide a vehicle cover which overcomes these and other shortcomings of the prior art.

SUMMARY OF THE INVENTION

The present invention provides a vehicle cover that overlays the painted exterior surfaces of a vehicle so as to provide protection from environmental elements, including swarf, that can mar the finish of the painted surfaces. The vehicle cover utilizes an elastic strip circumferentially extending along the bottom edge of the cover to hold the vehicle cover in place, and to ensure a tight fit over the vehicle. Portions of the cover overlaying all of the vehicle windows are provided with openings covered by transparent window sheets. The window sheets, in addition to better ensuring contaminants are prevented from entering underneath the cover, generally keep clear the driver's sight lines to provide desirable visibility to the driver. A zippered slit is also provided in the cover along the region which is aligned along the driver-side door to allow easy access to and from the driver seat when the cover is arranged over the vehicle.

In one form thereof, the present invention provides a vehicle cover including a flexible sheet structured and arranged for placement over a vehicle to overlay finished exterior surfaces of multiple outer body parts of the vehicle. A first region of the flexible sheet covers at least a majority portion of the finished exterior surface of a driver-side front door of the vehicle when the flexible sheet is placed over the vehicle, and a second region of the flexible sheet covers at least a portion of both a roof of the vehicle and the finished exterior surface of the vehicle body part located rearward of the driver-side front door when the flexible sheet is placed over the vehicle. Mating elements of a zipper are connected to facing edge portions of the first and second regions of the flexible sheet. When the zipper slider element is in a zipped-closed position, the zipper bridges the facing edge portions of the first and second regions of the flexible sheet. When the zipper slider element is in a zipped-open position, the zipper permits the driver-side front door to be opened while the flexible sheet remains in place over the vehicle.

In another form thereof, the present invention provides a cover for a vehicle including outer body panels with finished exterior surfaces. The cover includes means arrangeable over the vehicle for covering at least substantially all of the finished exterior surfaces of the outer body panels of the vehicle, and elastic means for retaining the covering means on the vehicle during vehicle transport. The elastic means is attached to the covering means proximate a bottom edge of the covering means and is disposed along at least a majority portion of a vehicle encircling length of the bottom edge.

In still another form thereof, the present invention provides a vehicle cover including a flexible sheet structured and arranged to closely fit over a vehicle. A first sheet portion of the flexible sheet covers a vehicle roof, a second sheet portion depending from the first sheet portion covers at least substantially all of a front of the vehicle including a hood and a front bumper, a third sheet portion depending from the first sheet portion covers at least substantially all of a back of a vehicle including a rear bumper, a fourth sheet portion depending from the first sheet portion covers at least substantially all of a first side of the vehicle including a driver-side front door, and a fifth sheet portion depending from the first sheet portion for covering at least substantially all of a second side of the vehicle including a passenger-side front door. Each of the second sheet portion, third sheet portion, fourth sheet portion, and fifth sheet portion includes at least one opening adapted to overlay a different vehicle window when the flexible sheet is fitted over the vehicle. The cover includes a plurality of transparent sheets for covering the openings in the second sheet portion, third sheet portion, fourth sheet portion, and fifth sheet portion. Each of these transparent sheets is fixedly attached to the flexible sheet, thereby allowing driver visibility through the flexible sheet openings while hindering contaminants from passing through the flexible sheet openings to a location between the flexible sheet and the vehicle. The cover also includes at least one elastic strip attached to the flexible sheet proximate a bottom edge of the second sheet portion and the third sheet portion and at regions of the second and third sheet portions engageable with the underside of the vehicle to thereby retain the flexible sheet on the vehicle.

One advantage of the inventive vehicle cover is that it protects the finish of the vehicle on which it is employed during vehicle transport.

Another advantage of the inventive vehicle cover is that it can be fit over a vehicle relatively easily and quickly, thereby reducing personnel costs associated with the vehicle covering process.

Still another advantage of the inventive vehicle cover is that after its use with a first vehicle, it can be removed and reused with another vehicle.

Yet another advantage of the inventive vehicle cover is that its zippered access opening to the driver's door achieves a consistent and easy-to-use opening and closing of the portion of the cover overlaying the door relative to the remainder of the vehicle cover, thereby allowing a person to quickly gain access to and exit from the driver's seat of a covered vehicle.

Another advantage of the inventive vehicle cover is that its zippered access opening to the driver's door consistently achieves a reliable barrier to contaminants.

Another advantage of the vehicle cover of the present invention is that its multitude of transparent windows reduces blind spots for a driver of a vehicle covered by the cover.

Still another advantage of the vehicle cover of the present invention is that its conforming fit to the supports of rear-view door mirrors limits the introduction of contaminants while allowing the mirrors to remain uncovered so as to be visible for use, and further reduces the likelihood of inadvertent cover removal.

Yet another advantage of the inventive vehicle cover is that its customized fit and elastic securement limits the entry of contaminants under the cover and further resists dislodgement of the cover during vehicle transport.

Another advantage of the present invention is that the cross-corner elastic anchoring straps under each bumper resist cover dislodgement and provide a self-adjusting feature by elastic rebound if the cover is not installed perfectly.

Still another advantage of the vehicle cover of the present invention is that the portion of the cover overlaying the driver's door may be readily attached to the door so as to not fall down when that door is opened.

Yet another advantage of the present invention is that a fastener is provided to aid in preventing the zippered driver's door access opening from inadvertently becoming unzipped during use.

BRIEF DESCRIPTION OF THE DRAWINGS

The above mentioned and other advantages and objects of this invention, and the manner of attaining them, will become more apparent and the invention itself will be better understood by reference to the following description of embodiments of the invention taken in conjunction with the accompanying drawings, wherein:

FIG. 10 is a top plan view of the component sheet parts that are assembled in forming the flexible base sheet of the vehicle transport cover of FIG. 1.

Figure 1:
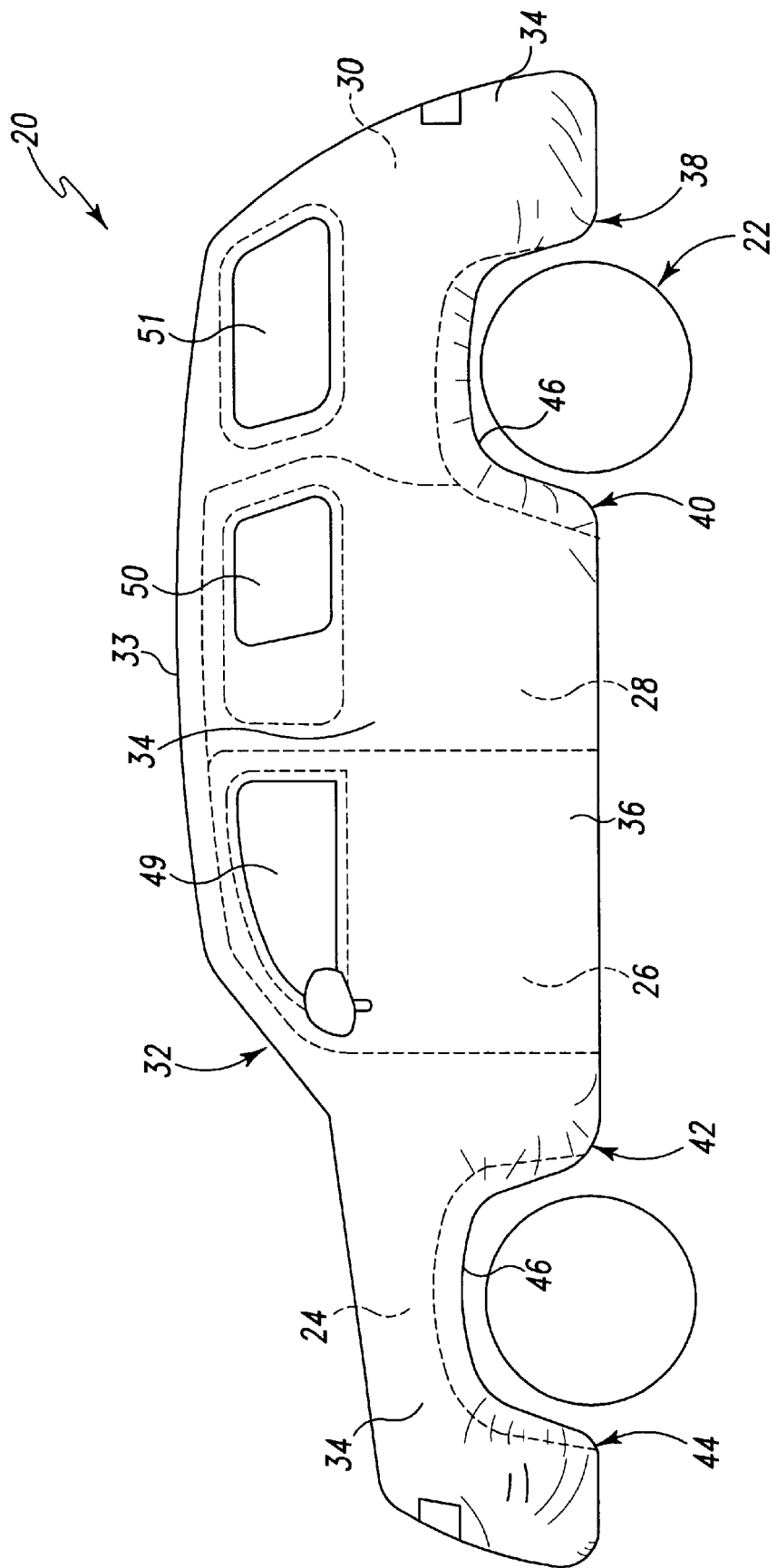
FIG. 1 is a side elevational view of a first embodiment of a vehicle transport cover of the present invention operatively installed over a diagramatically shown sport utility vehicle.

Corresponding reference characters indicate corresponding parts throughout the several views. Although the drawings represent an embodiment of the present invention, the drawings are not necessarily to scale and certain features may be exaggerated or omitted in order to better illustrate and explain the present invention.

DESCRIPTION OF THE PREFERRED EMBODIMENTS

Referring now to the side view of FIG. 1, there is shown a first embodiment of a vehicle transport cover configured according to the present invention. The vehicle transport cover, generally designated 20, is shown in use after being operatively installed or placed in a fitting arrangement over a sport utility vehicle, generally designated 22. In this illustrated embodiment of cover 20, vehicle 22 is a Dodge Durango. As is conventional, vehicle 22 includes outer body parts or panels, mounted to the vehicle chassis, which have painted or otherwise finished exterior surfaces that can be damaged by environmental conditions. For example, and underneath cover 20 so therefore referenced with dashed lines, the outer body of the vehicle driver-side includes a front panel 24, a front door panel 26, a rear door panel 28, and a rear panel 30 that is formed by an upper panel and a wraparound portion of the rear bumper. All of panels 24, 26, 28 and 30 have painted exterior surfaces. As will be appreciated in view of its description herein, cover 20 provides a protective wrap or covering to protect these painted surfaces from the environment while the vehicle is transported between or stored at locations, such as the site of manufacturer and a dealer's lot.

While cover 20 is shown particularly designed to fit a Durango brand sport utility vehicle, the inventive cover is not limited to such a configuration. With appropriate modifications or customizations to the cover design to achieve a suitable fit, different types of vehicles, including vans, pick-up trucks, sedans, and other SUVs may also be equipped with and thereby protected by vehicle transport covers within the scope of the present invention.

Cover 20 is formed from a flexible base sheet 32 that is custom structured and assembled to closely fit over the particular type of vehicle with which it is intended to be used to furnish the desired amount of finished surface coverage. For example, for the described vehicle which has a maximum circumference in a horizontal plane of approximately forty-four feet three inches, and at the sheet location conforming to that girth when installed, base sheet 32 has a perimeter of approximately forty-five feet three inches. Larger spacing between the vehicle and cover could naturally be provided, but tighter fits may aid in keeping the cover in place when installed. Base sheet 32 is made from one or more of a variety of preferably moisture-resistant materials that serve to prevent contaminants from contacting the painted surfaces of the vehicle. One suitable type of base sheet material is a spunbonded polypropylene, which is presently preferred due to it being relatively inexpensive and commonly available. Alternate base sheet materials include a polyurethane-backed polyester knit that provides a stretch for a tight fit to the vehicle, an oxford cloth that is a highly durable and abrasion resistant, densely woven nylon, or a lightweight, thin nylon sheeting with a polyethylene coating.

Base sheet 32 includes an upper portion 33 that overlays the roof or roof panel of vehicle 22. For vehicles including roof racks, extra fabric to accommodate such racks may be designed into the upper portion 33. As shown in FIG. 1, downwardly depending from upper portion 33 is a vehicle left or driver side covering portion 34 that overlays all of the exterior surfaces of front panel 24, front door 26, rear door 28, and rear panel 30. Left side covering portion 34 is sized to hang down such that the lowest extent of its bottom edge portion 36 generally extends slightly below the base, or downwardly facing part, of the body panels to be wrappable thereunder. In addition, adjacent the left-side rear wheel well, areas 38 and 40 of bottom edge portion 36 of covering portion 34 are configured to provide enlarged underlap that serve as shallow pockets into which fit the corner edges of the regions of rear body panel 30 that define the wheel well opening. This cover pocket fit, which aids in keeping cover 20 from lifting off vehicle 22 during transport, is further illustrated in FIGS. 8 and 9. Areas 42 and 44 of bottom edge portion 36 of covering portion 34 adjacent the left-side front wheel well are similar configured to fit over the front body panels edges.

For vehicles on which running boards are furnished below the body panels and extending between the wheel wells, to protect these boards during shipment, the length which the base cover hangs down will preferably be increased to permit the side covering portion to fit over and generally wrap under these boards along their lengths, and further the areas 38, 40 and 42, 44 of the covering portions will be customized as appropriate to achieve a more pocketed fit over the running board ends.

To aid in retaining cover 20 on vehicle 22, an extended elastic strip 46 is fixedly attached proximate to, and preferably immediately along the base of, bottom edge portion 36 along the entire front bumper-to-rear-bumper extending length of bottom edge portion 36. Bottom edge portion 36 is not straight as it juts upward to account for the wheel wells, and juts downward to account for the panel corner pocket fits, as described below. As apparent in the bottom view of FIG. 9, the elastic nature of strip 46 tending to return it toward its unextended length serves to draw together the bottom edge portion 36, and in so doing draws together under the vehicle the cover portions, including the enlarged underlap areas 38, 40, 42 and 44 that form the cover pockets, wrappable thereunder. This elastic drawing together aids in pulling the cover down tautly over the vehicle for a tight fit. In addition, as a result of the securing of cover 20 to vehicle 22 through the use of the cover pockets at the wheel well corners which causes the cover edge to be inward from the outer body panel exterior surface, and because the upwardly recessed sections of the bottom edge portion overlaying the wheel wells, including any wheel flairs, extend below the top of the wheel wells which are shown in dashed lines in FIG. 1, the segment of elastic strip 46 along the length of bottom edge portion 36 overlaying the wheel wells causes the cover to bow inwardly to aid in preventing contaminants from reaching the surfaces overlaid by cover 20.

Elastic strip 46 is made from a one-inch wide strip of a fabric covered rubber material that during manufacture is folded in half over the bottom edge of the cover. As described below, a single strip 46 is continuously attached to the base sheet 32 bottom edge portion that encircles the vehicle. For the Dodge Durango, for which the non-straight bottom edge portion has a vehicle encircling length of approximately fifty feet two inches, an elastic strap having an unextended length of approximately twenty-four feet is stretched and attached to that vehicle encircling length.

Cover 20 also includes transparent window sheets 49, 50 and 51 that are fixedly secured to left side covering portion 34 in registry with complementary shaped, but slightly smaller, window openings through the covering portion 34. A suitable material for the vehicle window sheets 49–51, as well as the other window sheets and light coverings, is a clear plastic material that has been drawn from a roll of 5.0 millimeter thickness polyethylene film. Other thicknesses of polyethylene film, such as within a range of 2–6 millimeter thickness, as well as different material types of clear coverings, may be employed within the scope of the present invention.

As shown in FIG. 1, each of window sheets 49–51 overlays one of the vehicle driver-side windows, the outlines of which are indicated in dashed lines. Although shown as being smaller in size than, and generally correspondingly shaped to, the vehicle windows, window sheets 49–51 may be differently shaped or sized, including oversized, within the scope of the present invention. Window sheets 49–51 allow for enhanced visibility for the driver of covered vehicle 22 while simultaneously preventing contaminants from passing through the base sheet window openings.

Window sheets 49–51 are secured to covering portion 34 around the entire window sheet perimeter. Adhesives and the like may be employed within the scope of the invention, but stitching is the preferred manner of securement. To avoid difficulties often experienced in sewing dissimilar materials together, a preferred technique to facilitate this stitching process is to first take a narrow band or strip of the material used for base sheet 32, arrange it around the entire perimeter of a transparent sheet before attachment of that sheet to base sheet 32, fold the band edges over both sides of the transparent sheet such that the edge of the transparent sheet is sandwiched between the folded over band edges, and then stitch through the folded over strip and sandwiched sheet. The then banded transparent sheet subsequently can be sewn to covering portion 34. The results of this technique are shown in the cross-sectional view of FIG. 4, where a fold of window banding 54 is disposed between window sheet 49 and covering portion 34. This banding/sewing technique is preferably employed with all of the coverings for the windows on the sides, front and rear of the vehicle, as well with the headlight coverings and tail light coverings described below.

Figure 2:
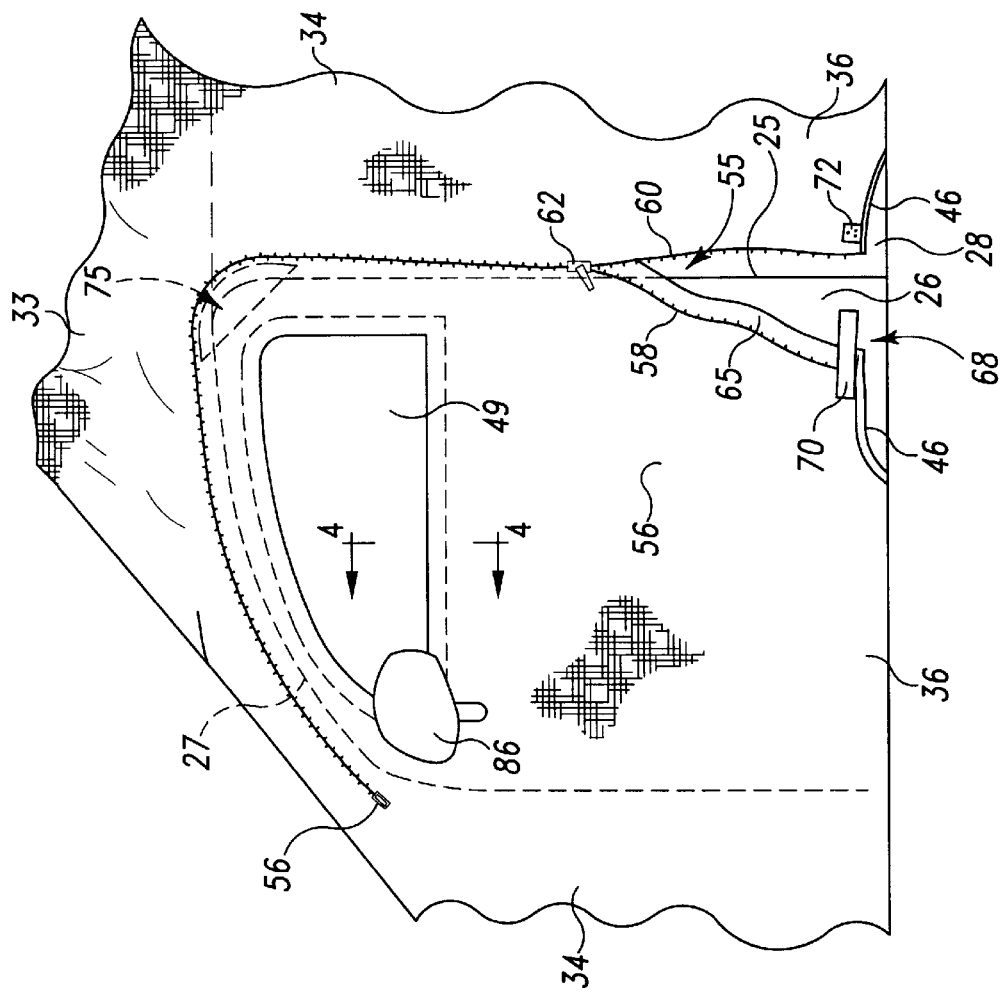
FIG. 2 is a partial, perspective view of an openable and closable region of the vehicle transport cover that overlays the driver-side front door.

With reference now to the enlarged perspective view of FIG. 2, the structural features of cover 20 that permits a person to readily gain entry to and to exit from the driver's seat of vehicle 22 while overlaid with cover 20 will now be further explained. A slit, generally indicated at 55, through the thickness of covering portion 34 and which starts at the cover bottom edge and generally continues along the rear edge 25 and top edge 27 of front door 26, causes a portion of left-side covering portion 34 to serve as a door covering flap 56. To ensure the sections of covering portion 34 above and rearward of slit 55 are not closed into the driver's door during use, slit 55 is preferably positioned slightly rearward of front door rear edge 25 and slightly above front door top edge 27. Slit 55 extends forward along the door top edge 27 to a point 56 forward of where front door 26 is hinged to vehicle 22.

Other slit configurations may alternatively be used. For example, a straight slit which extends vertically the entire height of covering portion 34 and then partially along the roof spanning width of upper portion 33 allows for front door opening while the cover is installed. Furthermore, more L-shaped slits that track less closely the top outline of the front door, including slits in which the horizontally extending L-leg only extends along the front door top edge minimally, such as 2 to 3 inches, may also be alternatively employed.

Selective opening and closing of slit 55 is achieved via a zipper mechanism. A zipper mechanism is preferred as it is readily operable by a user and because it is less likely than Velcro brand fasteners to unintentionally become closed during vehicle driving. The zipper mechanism includes toothed zipper strip 58 that is attached to the edge of door covering flap 56 along the length of slit 55, and a second toothed zipper strip 60 mateable with strip 58 that is attached along the length of slit 55 to the edge regions of covering portion 34, and possibly upper portion 33 depending on how high up the slit is designed to extend, that define slit 55. Zipper strips 58 and 60 are preferably attached to the base sheet material via stitching, such as using a lockstitch. Zipper element 62 slides along strips 58 and 60 and meshes together the teeth of strips 58 and 60 when pulled down, and releases the meshed engagement between strips 58 and 60 when moved upward and then forward along slit 55. The zipper teeth may be made of various materials, such as metal or plastic, and further the mating teeth of the zipper mechanism may be replaced with other interlocking, zippable elements such as a mating plastic tongue and groove.

Projecting beneath the tooth zipper strips 58, 60 when arranged in a zipped-closed arrangement is protective flap 65. Flap 65, which is made of three folded layers of the same material as used to fabricate base sheet 32, is fixedly attached, such as be stitching, to the underside or interior surface of door covering flap 56. Flap 65 extends the entire length of slit 55 and provides a safety cushion between the zipper teeth and the vehicle to protect the vehicle finish from marring by the zipper.

A panel fastening module, generally designated 68, that aids in keeping door covering flap 56 closed when the zipper mechanism is in a zipped-closed arrangement flanks slit 55 at the base of bottom edge portion 36. Panel fastening module 68 includes a strap 70 attached, such as by stitching, to door covering flap 56. The underside of the rearward extent of strap 70 includes a hooks portion of a Velcro brand fastener that is engageable with a loops portion of a Velcro brand fastener located on the upper surface of strip 72 sewn to covering portion 34. Other known types of fasteners, such as buckles, snaps or clips, can be substituted for the Velcro brand fastening components within the scope of the present invention.

Figure 3:
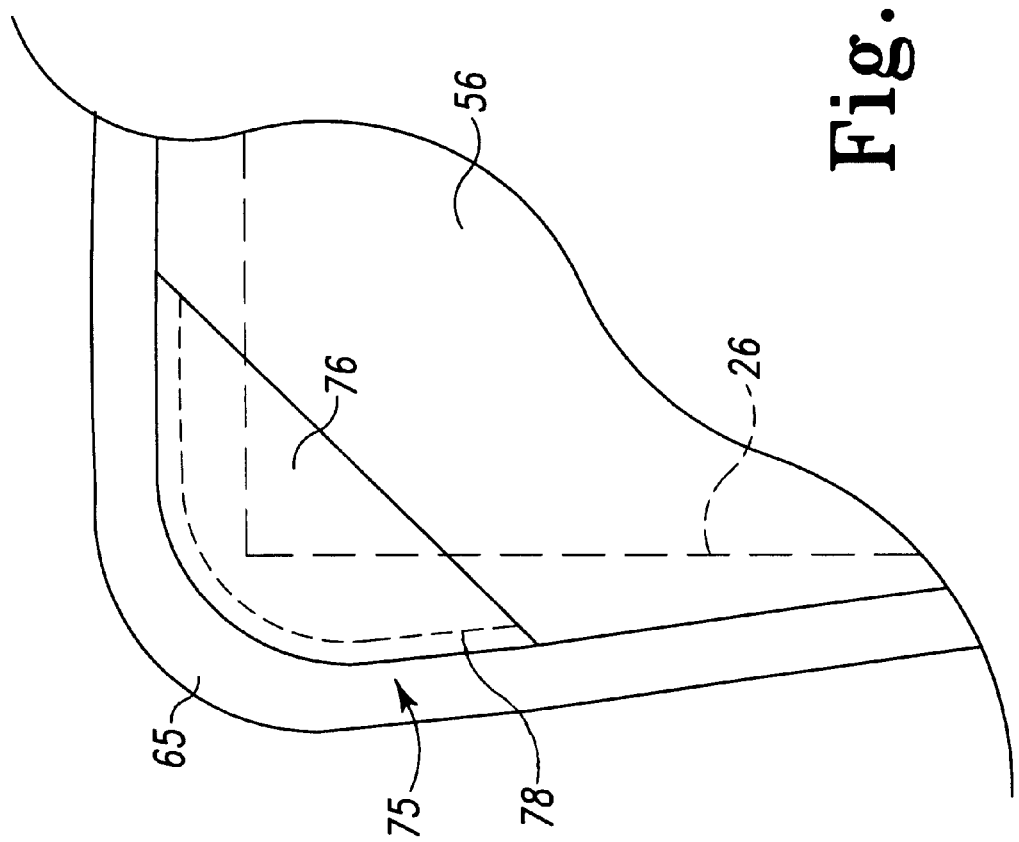
FIG. 3 is an elevational view, as seen from the driver's seat when the driver-side front door is open, of the portion of the vehicle transport cover that fits over the upper, rearward corner of the driver's door shown in dashed lines.

To prevent door covering flap 56 from falling downward when zipper slider 62 has been moved upward and forward to open the zippered slit 55, a a door-corner receiving element, generally designated 75, is furnished along the interior or vehicle-facing part of the upper, rearward region of door covering flap 56. As further shown in the view of FIG. 3, door-corner receiving element 75 is formed by a rounded triangular flap 76 of the base sheet material, stitched at 78 to door covering flap 56, that forms a pocket with the interior surface of door covering flap 56. During mounting of cover 20 to vehicle 22, door covering flap is temporarily pulled rearward to allow the upper corner of front door 26 shown in dashed lines in FIG. 3 to insert into the door-corner receiving pocket 75.

In alternate embodiments, flap 76 may be replaced with other door fastening elements that fit over the door corner, such as a loop or an elastic strap that diagonally extends from a point along the back edge of flap 56 to a point along the top edge of flap 56. Furthermore, a not shown door-corner receiving element may be provided in a similar fashion to element 75 to fit over the lower, rear corner of the driver-side front door.

Figure 4:
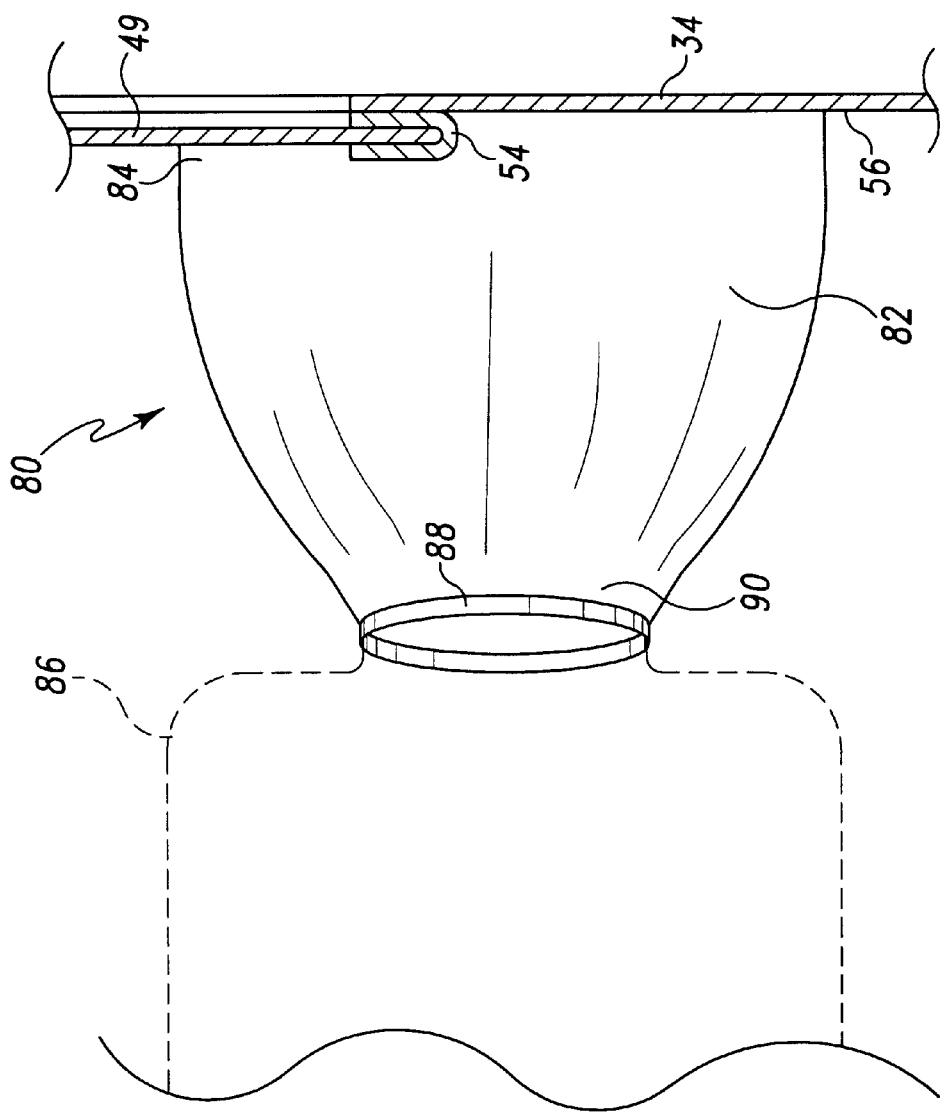
FIG. 4 is a cross-sectional view, taken along line 4—4 of FIG. 2, illustrating the protective cuff of the vehicle transport cover which surrounds the rearview door mirror support projecting from the exterior of the vehicle.

Referring now to FIG. 4, a mirror accommodating cuff 80 located forward of window sheet 49 is shown. Cuff 80 is formed from a cylindrical sleeve body 82 made of the same material as base sheet 32. A first end 84 of sleeve body 82 is fixedly attached around the sleeve body perimeter to door covering flap 56 around an opening therethrough through which the door-mounted rear view mirror, which is shown in dashed lines at 86, inserts during cover installation. An elastic band 88 is attached to and encircles the outer end 90 of sleeve body 82. Elastic band 88 is sized to conform to the mirror support over which it is installed, and therefore causes the outward end region of sleeve body 82 to be bunched together as shown in FIG. 4. For example, for a Dodge Durango having a mirror with a girth of approximately twenty-one inches, sleeve body 82 is made from an approximately six inch by twenty-two inch rectangular cut-out to have a twenty-two inch circumference, and elastic band 88 has an unextended length of approximately ten inches. Cuff 80 serves to reduce the introduction of contaminants to a location between vehicle 20 and cover 22 while still allowing a driver to use door-mounted outside rear view mirror 86.

In an alternate, not shown embodiment, the protective cuff can be replaced with a larger, closed-ended bag made of a transparent material such as plastic into which the mirror fits. Such an alternate construction also protects the mirror from the environment without rendering the rearview mirror useless while the cover is employed.

Figure 5:
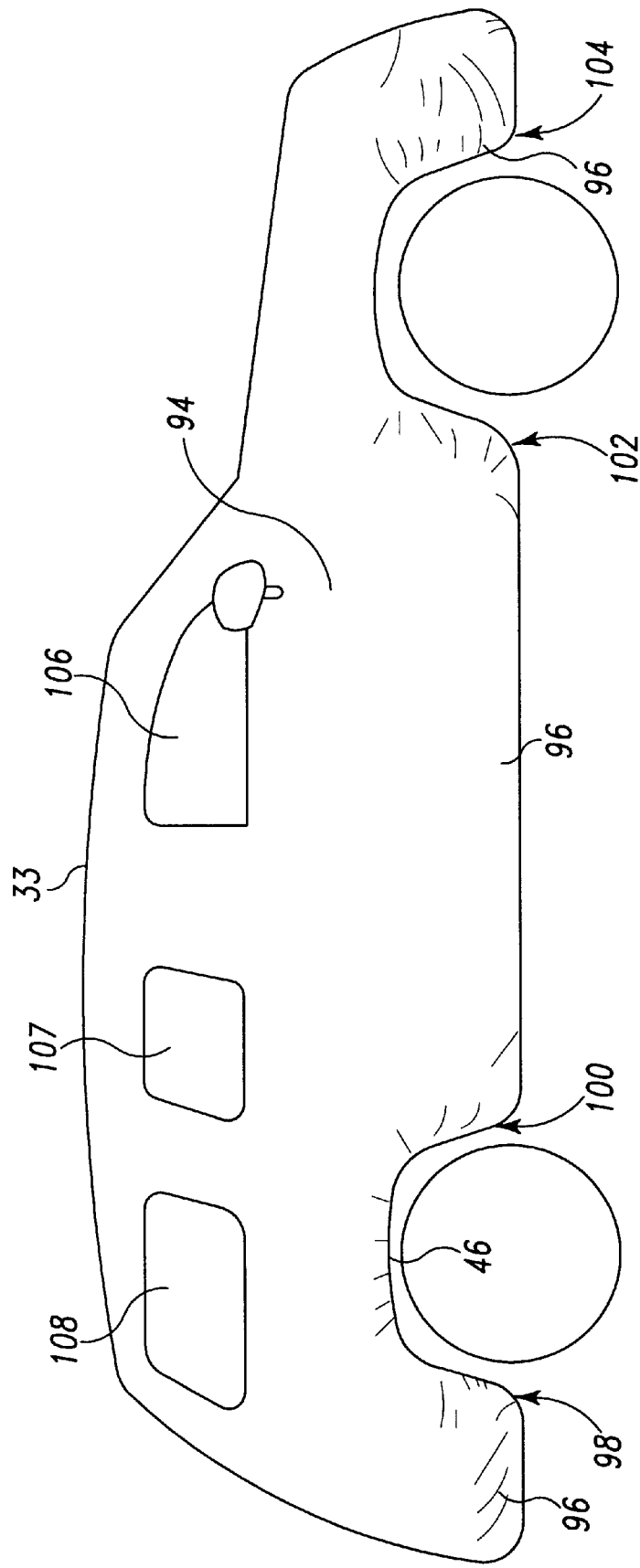
FIG. 5 is an opposite side elevational view of the vehicle transport cover of FIG. 1.

With reference now to FIG. 5, downwardly depending from upper portion 33 is a vehicle right or passenger side covering portion 94. Except for certain differences specified below, covering portion 94 is a mirror image of left side covering portion 34, and therefore the description of its configuration is limited herein. Covering portion 94 is sized to hang down to overlay all of the exterior surfaces of the vehicle body side panels such that its bottom edge portion 96 generally extends slightly below the base of the body panels to be wrappable thereunder. Covering portion 94 also therefore includes bottom edge portion areas 98, 100, 102 and 104 of enlarged underlap that serve as shallow pockets into which fit the corner edges of the wheel well defining body panels. The same elastic strip 46 that extends along bottom edge portion 36 also extends along the entire length of bottom edge portion 96. Transparent window sheets 106, 107 and 108 are fixedly secured to right side covering portion 94 in registry with window openings therethrough. A protective cuff 110, as visible in FIGS. 6 and 7, is provided for the passenger door-mounted rear view mirror.

Covering portion 94 differs from covering portion 34 due to the fact that no means of ingress and egress to the passenger seat is required, and therefore no zippered door-aligned slit is provided, nor is any a panel fastening module or door-corner receiving element present. However, it will be appreciated that if the inventive cover was desired to be used with vehicles outside the United States which have steering wheels on the side considered the passenger side in the United States, covering portion 94 rather than, or even in addition to, covering portion 34 could be provided with the these ingress/egress enabling features.

Figure 6:
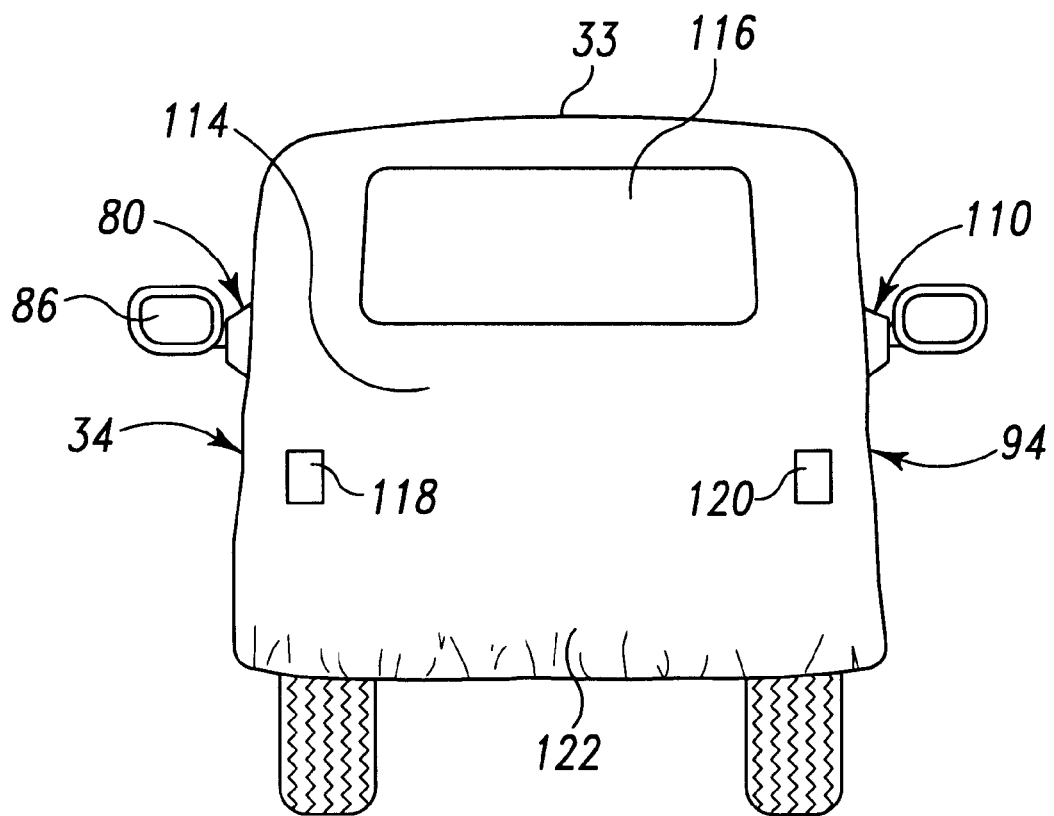
FIG. 6 is a rear elevational view of the vehicle transport cover of FIG. 1.
Figure 9:
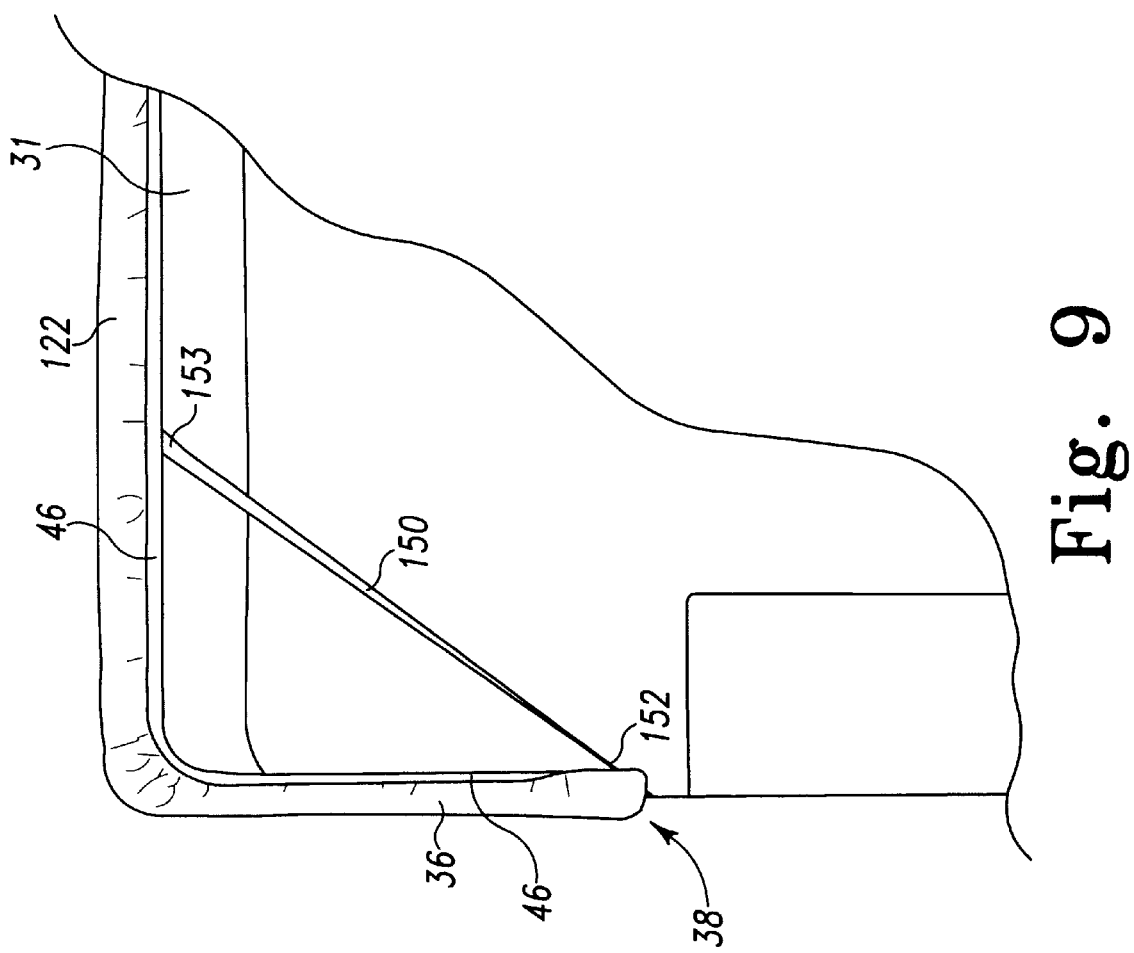
FIG. 9 is a partial, diagrammatic bottom view of the parts of the vehicle and cover shown in FIG. 8, further illustrating the configuration of the cover anchoring strap.

As shown in FIG. 6, downwardly depending from upper portion 33 is a vehicle rear covering portion 114 that is continuous with side covering portions 34 and 94 along the height of vehicle 22. An opening in covering portion 114 over the single rear window of vehicle 22 is covered by transparent window sheet 116, and transparent covers 118 and 120 cover tail light overlaying openings through covering portion 114. Covering portion 114 is sized to hang down to overlay essentially all of the exterior surfaces of the vehicle tail lift and rear bumper. As shown in FIG. 9, the bottom edge portion 122 extends sufficiently down to be slightly wrappable under the base or ground facing portion of the vehicle rear bumper indicated at 31. The same elastic strip 46 that extends along bottom edge portion 36 and bottom edge portion 96 of the side covering portions of cover 20 also extends along the entire length of bottom edge portion 122.

Figure 7:
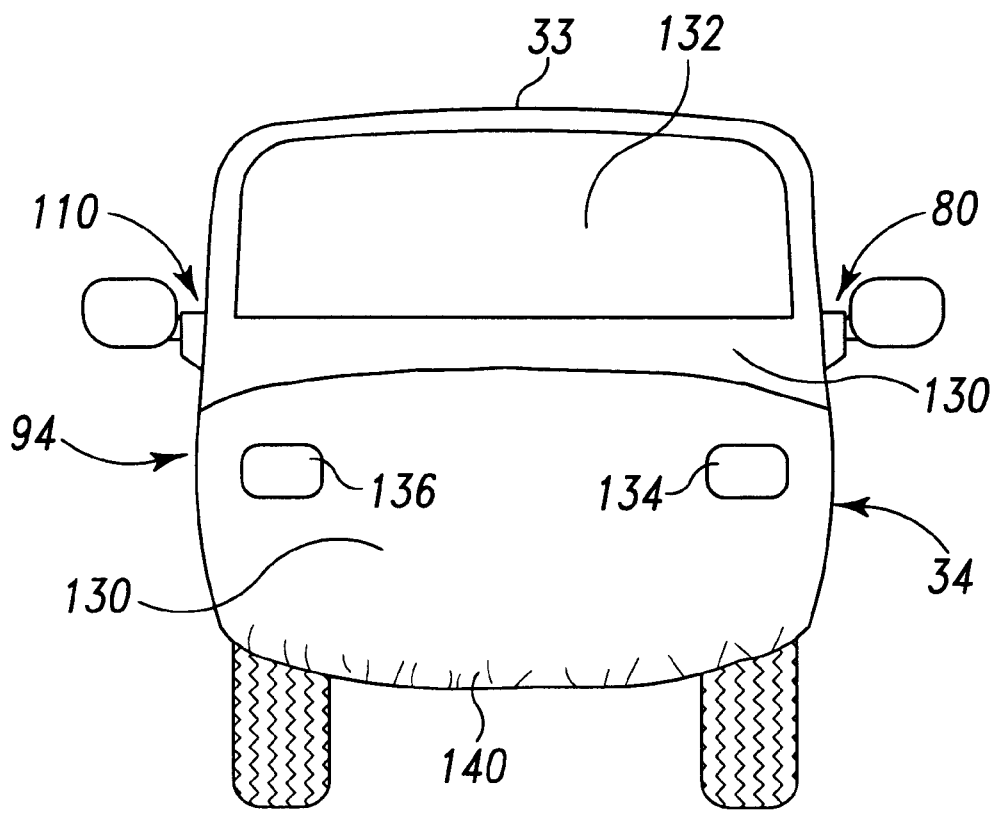
FIG. 7 is a front elevational view of the vehicle transport cover of FIG. 1.

As shown in FIG. 7, downwardly depending from base sheet upper portion 33 is a vehicle front covering portion 130 that is continuous with side covering portions 34 and 94 along the height of vehicle 22. The front window or windshield of vehicle 22 is overlaid by an opening in covering portion 130 that is covered by transparent window sheet 132. Transparent covers 134 and 136 cover headlight overlaying openings through covering portion 130. Covering portion 130 is sized to hang down to overlay essentially all of the finished exterior surfaces of the vehicle hood, grille and front bumper, and the bottom edge portion 140 wraps under the ground facing portion of the vehicle front bumper. The same elastic strip 46 that extends along the bottom edge portion of the side and rear covering portions of cover 20 also extends along the entire length of bottom edge portion 140.

As described above, a single elastic strip 46 preferably continuously extends along the base sheet bottom edge portions that completely encircle the vehicle 22 to thereby provide a reliable cover securement. It will be appreciated that rather than this single strap construction, multiple elastic strips, possibly including gaps in the circumferential continuity of the elastic, may be substituted within the scope of the invention. In some applications, elastic strips along merely the bumper covering portions of cover 20 may be sufficient to secure cover 20 adequately. In addition, the attached elastic strip ringing the bottom edge of cover 20 may be eliminated entirely if a material with sufficient elasticity is used for the base sheet. However, such a design typically is less desirable as it may complicate placement of the cover over the vehicle.

While elastic strip 46 serves to gather together the bottom edges that define the reduced size opening into the volume of space otherwise surrounded by base sheet 32, an optional cross-corner anchoring strap is preferably provided at each of the four vehicle corner covering regions of cover 20 to better ensure that vehicle cover 20 does not accidentally come off during vehicle transport. With additional reference to FIGS. 8 and 9, one anchoring strap, generally designated 150, at the rear, driver's side of vehicle 22 is shown. As the concept of each of the four anchoring straps is identical, the following explanation of anchoring strap 150 will be recognized as applying to the cover anchoring straps located at the other three corners of the vehicle.

Figure 8:
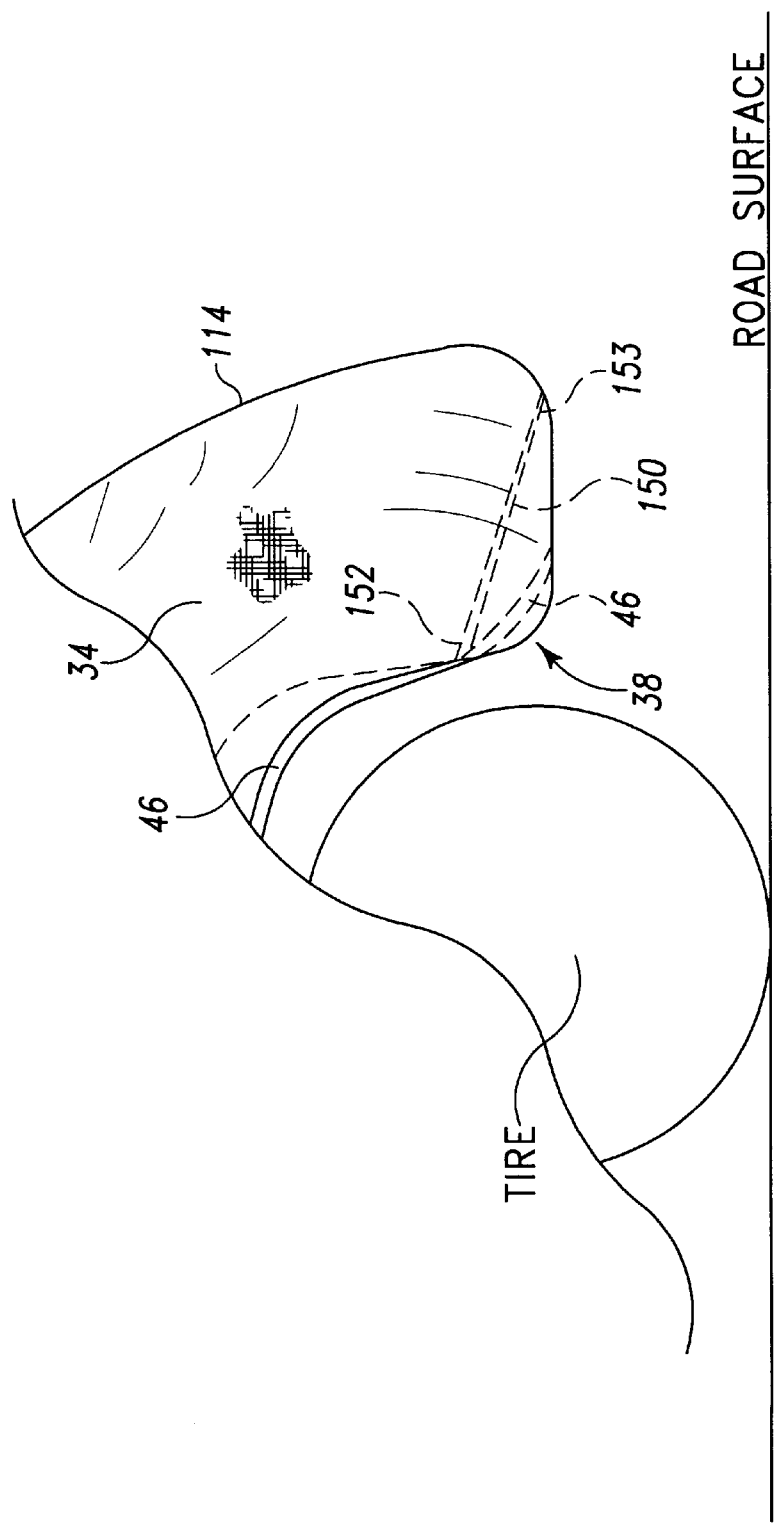
FIG. 8 is a partial, side elevational view of the rear body panel and rear bumper covering region of the vehicle transport cover of FIG. 1, wherein a cover anchoring strap is further illustrated.

Anchoring strap 150 is made from a fabric covered elastic strip that is oriented at an angle, typically of about forty-five degrees, to the edges of bottom edge portions 36 and 122 underwrapping the vehicle. The partial twisting of the strap shown in FIGS. 8 and 9 is a result of the opposite ends of anchoring strap 150 being oriented approximately 90° from each other due to the positioning of the strap, wherein end 152 is attached to a segment of bottom edge portion 36 aligned along a generally vertical edge of the wheel well defining body panel and end 153 is attached to a segment of bottom edge portion 122 aligned generally horizontal.

A preferred manner of securing the opposite ends of anchoring strap 150 to bottom edge portions 36 and 122 is to sew the ends in with elastic strip 46. Specifically, in preparation for the process of lengthwise sewing of strip 46 to the cover bottom edge portion during cover manufacture, elastic strip 46 is folded over with the cover edge sandwiched therebetween. The anchoring strap ends are inserted within the folds of the elastic strip, and during strip stitching the strap is also initially secured to base sheet 32. Next, the cover is bartacked twice through each strap end and sandwiching strip folds, thereby resulting in twenty-eight or more stitches through the ends of strap 150 and the elastic strip sandwiching it.

The structure of cover 20 will be further understood in view of the following general description of the process by which it may be manufactured. Base sheet 32 is formed by interconnecting sheet pieces designed such that when assembled together they will substantially conform to the exterior shape of the vehicle intended to be covered. Typically, the base sheet material or fabric is available on a roll that is sixty inches in width. After the material is pulled from the roll and laid flat on a cutting table of sufficient length and width, patterns are laid on top of the fabric and the fabric is cut along the pattern edges. FIG. 10 shows five sheet pieces 165, 166, 167, 168 and 169 made from corresponding patterns for cover 20. It will be appreciated that the various darts, such as indicated at 170–176, in sheet pieces 165–169 allows the base sheet to better conform to the overall shape of the vehicle when the pieces are sewn together. In FIG. 10, sheet pieces 165–169 are shown in an arrangement at which they are basically positioned to be sewn together, and sheet piece 165 serves to cover the vehicle grille. When the patterned sheet parts are so cut, they are taken to an operator to be further processed and ultimately sewn together.

After the zipper mechanism for door covering flap 56 is provided into sheet piece 167, the various plastic window sheets and light covers are sewn into the sheet pieces. The locations for the transparent window sheet and light covers are provided in the sheet pieces by drill holes that have been formed therein previously via a cloth drill, which holes outline the positions of the required sheet openings. After the window sheets, other than the windshield covering sheet, and light covers are sewn onto the sheet pieces, the base sheet fabric covered thereby is trimmed out, such as with scissors, such that both sides of the clear plastic window sheets and light covers are uncovered. The window sheets and light covers are sewn onto the sheet pieces with a lockstitch two-thread nylon, stitching through the bound edge and base sheet in two rows to provide a double seam for strength and resistance to displacement, as well as a double barrier for any contaminant trying to pass thereby.

The mirror accommodating protective cuffs that have been preformed are then sewn into place to sheet piece 167 over drill holes in the sheet piece, which hole outlined section is cut out to form the opening into the cuff. The fasteners of panel fastening module 60 are then sewn at the opening end of the zipper mechanism.

Body sheet pieces 165–169 of the cover are then joined along their facing edges via sewing with a serge stitch and nylon thread. This serge or overlock stitch utilizes three threads and has the advantage that if one thread breaks, the other two threads have a high likelihood of staying interwoven to preserve the seam. Furthermore, the stitch has more flexibility, due to its braiding characteristics, than the straight or lockstitch. Nylon thread is preferred for this attachment and the other stitchings described herein due to its promotion of seam strength and cover integrity at transport speeds. However, other thread materials, including polyester or cotton, may be employed within the scope of the invention.

After sheet pieces 165–169 are attached together, the windshield covering sheet is attached over the opening formed at the intersection of sheet pieces 166 and 167. Next, the elastic straps utilized for the cross-corner anchoring straps are attached as described above, and then elastic strip 46 is sewn around the entire periphery of the assembled base sheet. Elastic strip 46 is fed into the sewing operation through a pressure device that pulls it taut as it is sewn, the result being that the elastic strip 46 tends to draw the vehicle cover bottom edge portion into an arrangement which is smaller in circumference than the vehicle bottom. When the elastic rebounds after passing through the needle area, it gathers the cover bottom edge and creates a continuous draw at all points on the cover circumference.

After cover 20 has been so fashioned, the cover is laid inside-out on a table, and folded starting at the vehicle rear covering portion and moving forward. At the front end which is folded last, a portion of an edge with elastic strip 46 is pulled up out of the folded pack and up over the folded cover like a lip, and holds the package together to be ready for application. The elasticized edge may be labeled in front such that the eventual user will know where to begin opening the folded cover, thereby developing a more efficient application routine.

While this invention has been shown and described as having multiple designs, the present invention may be further modified within the spirit and scope of this disclosure. For example, while the side covering portions and front and rear covering portions of cover 20 are shown and described as covering essentially all of the finished surfaces of the outer body panels, lesser degrees of covering for given applications may be employed within the scope of the present invention. For instance, in situations where it may be unnecessary to cover the front grill, front covering portion 130 can be upwardly opened to allow those finished surfaces to be exposed. Furthermore, in situations where finite portions of the vehicle exterior surface are desired to be exposed, the remainder of the vehicle exterior surfaces could still have the benefit of the protective covering of the instant invention. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle cover comprising:

a flexible sheet structured and arranged for placement over a vehicle to overlay finished exterior surfaces of multiple outer body parts of the vehicle, said flexible sheet comprising a first region and a second region, wherein said flexible sheet first region covers at least a majority portion of the finished exterior surface of a driver-side front door of the vehicle when said flexible sheet is placed over the vehicle, wherein said flexible sheet second region covers at least a portion of both a roof of the vehicle and the finished exterior surface of the vehicle body part located rearward of the driver-side front door when said flexible sheet is placed over the vehicle;

a zipper having a slider element and mating elements connected to facing edge portions of said first and second regions of said flexible sheet, wherein said zipper when said slider element is in a zipped-closed position bridges said facing edge portions of said first and second regions, and wherein said zipper when said slider element is in a zipped-open position permits the driver-side front door to be opened while said flexible sheet remains in place over the vehicle; and wherein said flexible sheet further comprises a protective sleeve having first and second ends, wherein said first end is fixedly secured to said first region of said flexible sheet around an opening through said flexible sheet first region, said protective sleeve including an elastic band attached to and encircling said second end, said protective sleeve elastic band expandable to allow insertion of a door mirror therethrough during placement of said flexible sheet over the vehicle, wherein said elastic band elastically conforms to a periphery of a support arm of the door mirror, thereby permitting door mirror visibility during cover use while preventing contaminants from entering said protective sleeve.

2. The vehicle cover of claim 1 wherein said flexible sheet comprises a plurality of interconnected sheet pieces custom structured and assembled to substantially conform to an exterior shape of a specific vehicle type for which cover use is intended.

3. The vehicle cover of claim 1 wherein said zipper when said slider element is in a zipped-closed position is generally continuously aligned along a rear edge and a top edge of the driver-side front door when said flexible sheet is in place over the vehicle.

4. The vehicle cover of claim 1 further comprising means for releasably attaching said flexible sheet first region onto an upper, rearward corner of the driver-side front door of the vehicle to prevent said flexible sheet first region from falling down when said zipper slider element is disposed in a zipped-open position to allow driver-side front door opening.

5. The vehicle cover of claim 4 wherein said means for releasably attaching said flexible sheet first region comprises a fabric flap that forms a door-corner receiving pocket with a vehicle-facing surface of said flexible sheet first region.

6. The vehicle cover of claim 1 further comprising means for releasably fastening together said first and second regions of said flexible sheet proximate a bottom edge of said first region to aid in keeping said zipper in a zipped-closed arrangement.

7. The vehicle of claim 1 further comprising a finish protecting flap attached to one of said first and second regions of said flexible sheet and adapted to project beneath and along at least substantially all of the length of said mating elements of said zipper when in a zipped-closed arrangement so as to be interposed between said mating elements and the vehicle.

8. The vehicle cover of claim 1 wherein said flexible sheet overlays at least substantially all of the finished exterior surfaces of the sides, front and back of the vehicle.

9. A cover for a vehicle including outer body panels with finished exterior surfaces, comprising:

means arrangeable over the vehicle for covering at least substantially all of the finished exterior surfaces of the outer body panels of the vehicle, said covering means comprising a base sheet including a plurality of openings adapted to overlay windows of the vehicle when said covering means is arranged over the vehicle, said covering means comprising a bottom edges said bottom edge comprising upwardly recessed sections aligned with all of the wheel wells of the vehicle; and elastic means for retaining said covering means on the vehicle during vehicle transport, said elastic means attached to said covering means proximate the bottom edge of said covering means and disposed along at least substantially all of a vehicle encircling length of said bottom edge, wherein said elastic retaining means is disposed along the entire lengths of said upwardly recessed sections of said covering means to cause said upwardly recessed sections to bow inwardly into the wheel wells to limit contaminants from reaching underneath the covering means while said covering means remains clear of contact with vehicle wheels in the wheel wells during driving of the vehicle.

10. The cover of claim 9 wherein said elastic retaining means comprises a continuous elastic strip attached lengthwise along the entire vehicle encircling length of said bottom edge, said elastic strip having an unextended length less than a length of said bottom edge to which said strip is attached, whereby said bottom edge is arranged in a gathered together fashion when said elastic strip is unextended.

11. The cover of claim 10 wherein said coveting means further comprises a plurality of transparent sheets sized to cover said plurality of base sheet openings, each of said plurality of transparent sheets being fixedly attached to said base sheet to cover a different base sheet opening, thereby allowing driver visibility through said base sheet openings while preventing contaminants from passing through said base sheet openings to a location between said base sheet and the vehicle.

12. The cover of claim 11 wherein each of said plurality of transparent sheets is sewn to said base sheet along a perimeter of said transparent sheet.

13. The cover of claim 11 wherein said pluralities of base sheet openings and transparent sheets comprises a base sheet opening and a transparent sheet for each window of the vehicle.

14. The cover of claim 9 further comprising a plurality of anchoring straps diagonally extending between bottom edges of portions of said covering means arranged over different surfaces of the vehicle.

15. A vehicle cover comprising:
  a flexible sheet structured and arranged to closely fit over a vehicle, said flexible sheet comprising a first sheet portion for covering a vehicle roof, a second sheet portion depending from said first sheet portion for covering at least substantially all of a front of the vehicle including a hood and a front bumper, a third sheet portion depending from said first sheet portion for covering at least substantially all of a back of a vehicle including a rear bumper, a fourth sheet portion depending from said first sheet portion for covering at least substantially all of a first side of the vehicle including a driver-side front door, and a fifth sheet portion depending from said first sheet portion for covering at least substantially all of a second side of the vehicle including a passenger-side front door;
  wherein each of said second sheet portion, said third sheet portion, said fourth sheet portion, and said fifth sheet portion comprises at least one opening adapted to overlay a different vehicle window when the flexible sheet is fitted over the vehicle;
  a plurality of transparent sheets for covering the at least one opening in said second sheet portion, said third sheet portion, said fourth sheet portion, and said fifth sheet portion, each of said plurality of transparent sheets fixedly attached to said flexible sheet, thereby allowing driver visibility through said flexible sheet openings while hindering contaminants from passing through said flexible sheet openings to a location between said flexible sheet and the vehicle;
  at least one elastic strip attached to said flexible sheet proximate a bottom edge of said second sheet portion and said third sheet portion and at regions of said second and third sheet portions engageable with the underside of the vehicle to thereby retain said flexible sheet on the vehicle; and
  wherein said flexible sheet further comprises a protective sleeve having first and second ends, wherein said first end is fixedly secured to said fourth sheet portion of said flexible sheet around an opening through said flexible sheet fourth sheet portion, said protective sleeve including an elastic band attached to and encircling said second end, said protective sleeve elastic band expandable to allow insertion of a door mirror therethrough during placement of said flexible sheet over the vehicle, wherein said elastic band elastically conforms to a periphery of a support arm of the door mirror, thereby permitting door mirror visibility during cover use while preventing contaminants from entering said protective sleeve.

16. The vehicle cover of claim 15 wherein said at least one elastic strip extends along an entire vehicle encircling length of bottom edges of said second sheet portion, said third sheet portion, said fourth sheet portion and said fifth sheet portion.

17. The vehicle cover of claim 15 wherein said fourth sheet portion comprises a slit generally aligned along a rear edge and a top edge of the driver-side front door, and a zipper having a slider element and mating elements connected to facing sheet edges that define said slit, wherein said zipper when in a zipped-closed arrangement bridges said facing sheet edges, and wherein said zipper when in a zipped-open arrangement permits the driver-side front door to be opened while said flexible sheet remains in place over the vehicle.

18. The vehicle cover of claim 15 further comprising a plurality of elastic anchoring straps diagonally extending between bottom edges of adjacent sheet portions.

19. The vehicle cover of claim 18 wherein said plurality of anchoring straps comprises a first anchoring strap and a second anchoring strap, wherein said first anchoring strap extends between the bottom edges of said second sheet portion and one of said fourth and fifth sheet portions, and wherein said second anchoring strap extends between the bottom edges of said third sheet portion and one of said fourth and fifth sheet portions.

20. A vehicle cover comprising:
  a flexible sheet structured and arranged for placement over a vehicle to overlay finished exterior surfaces of multiple outer body parts of the vehicle, said flexible sheet comprising a first region and a second region, wherein said flexible sheet first region covers at least a majority portion of the finished exterior surface of a driver-side front door of the vehicle when said flexible sheet is placed over the vehicle, wherein said flexible sheet second region covers at least a portion of both a roof of the vehicle and the finished exterior surface of the vehicle body part located rearward of the driver-side front door when said flexible sheet is placed over the vehicle;
  a zipper having a slider element and mating elements connected to facing edge portions of said first and second regions of said flexible sheet, wherein said zipper when said slider element is in a zipped-closed position bridges said facing edge portions of said first and second regions, and wherein said zipper when said slider element is in a zipped-open position permits the driver-side front door to be opened while said flexible sheet remains in place over the vehicle; and
  means for releasably attaching said flexible sheet first region onto an upper, rearward corner of the driver-side front door of the vehicle to prevent said flexible sheet first region from falling down when said zipper slider element is disposed in a zipped-open position to allow driver-side front door opening.

21. The vehicle cover of claim 20 wherein said means for releasably attaching said flexible sheet first region comprises a fabric flap that forms a door-corner receiving pocket with a vehicle-facing surface of said flexible sheet first region.

22. A vehicle cover comprising:
  a flexible sheet structured and arranged to closely fit over a vehicle, said flexible sheet comprising a first sheet portion for covering a vehicle roof, a second sheet portion depending from said first sheet portion for covering at least substantially all of a front of the vehicle including a hood and a front bumper, a third sheet portion depending from said first sheet portion for covering at least substantially all of a back of a vehicle including a rear bumper, a fourth sheet portion depending from said first sheet portion for covering at least substantially all of a first side of the vehicle including a driver-side front door, and a fifth sheet portion depending from said first sheet portion for covering at least substantially all of a second side of the vehicle including a passenger-side front door;
  wherein each of said second sheet portion, said third sheet portion, said fourth sheet portion, and said fifth sheet portion comprises at least one opening adapted to overlay a different vehicle window when the flexible sheet is fitted over the vehicle;
  a plurality of transparent sheets for covering the at least one opening in said second sheet portion, said third sheet portion, said fourth sheet portion, and said fifth sheet portion, each of said plurality of transparent sheets fixedly attached to said flexible sheet, thereby allowing driver visibility through said flexible sheet openings while hindering contaminants from passing through said flexible sheet openings to a location between said flexible sheet and the vehicle;

at least one elastic strip attached to said flexible sheet proximate a bottom edge of said second sheet portion and said third sheet portion and at regions of said second and third sheet portions engageable with the underside of the vehicle to thereby retain said flexible sheet on the vehicle;

wherein said fourth sheet portion comprises a slit generally aligned along a rear edge and a top edge of the driver-side front door, and a zipper having a slider element and mating elements connected to facing sheet edges that define said slit, wherein said zipper when in a zipped-closed arrangement bridges said facing sheet edges, and wherein said zipper when in a zipped-open arrangement permits the driver-side front door to be opened while said flexible sheet remains in place over the vehicle; and means for releasably attaching said flexible sheet fourth sheet portion onto an upper, rearward corner of the driver-side front door of the vehicle to prevent said flexible sheet fourth sheet portion from falling down when said zipper slider element is disposed in a zipped-open position to allow driver-side front door opening.

23. The vehicle cover of claim 22 wherein said means for releasably attaching said flexible sheet fourth sheet portion comprises a fabric flap that forms a door-corner receiving pocket with a vehicle-facing surface of said flexible sheet fourth sheet portion.

* * * * *

UNITED STATES PATENT AND TRADEMARK OFFICE
CERTIFICATE OF CORRECTION

PATENT NO : 6,099,067
DATED : August 8, 2000
INVENTOR(S): Alice M. Butterworth

It is certified that error appears in the above-identified patent and that said Letters Patent are hereby corrected as shown below:

In column 7, line 18, replace "comers" with --corners--.

In column 11, line 23, replace "comers" with --corners--.

In column 14, line 32, replace "edges" with --edge,--.

In column 14, line 55, replace "coveting" with --covering--.

Signed and Sealed this

Twenty-fourth Day of April, 2001

*Attest:*

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO. : 6,099,067  
DATED : August 8, 2000  
INVENTOR(S) : Butterworth

Page 1 of 1

It is certified that error appears in the above-identified patent and that said Letters Patent is hereby corrected as shown below:

Column 14,
Line 53, replace "10" with -- 9 --

Signed and Sealed this

Ninth Day of September, 2003

JAMES E. ROGAN
*Director of the United States Patent and Trademark Office*

EX PARTE REEXAMINATION CERTIFICATE (5448th)
United States Patent
Butterworth

(10) Number: US 6,099,067 C1
(45) Certificate Issued: Jul. 11, 2006

(54) VEHICLE TRANSPORT COVER

(75) Inventor: Alice M. Butterworth, Marion, IN (US)

(73) Assignee: Butterworth Industries, Inc., Gas City, IN (US)

Reexamination Request:
No. 90/007,320, Nov. 26, 2004

Reexamination Certificate for:
Patent No.: 6,099,067
Issued: Aug. 8, 2000
Appl. No.: 09/276,375
Filed: Mar. 25, 1999

Certificate of Correction issued Apr. 24, 2001.

Certificate of Correction issued Sep. 9, 2003.

(51) Int. Cl.
*B60J 11/00* (2006.01)

(52) U.S. Cl. .............. 296/136.07; 296/136.1; 135/88.05; 150/166

(58) Field of Classification Search .............. 296/95.1, 296/102, 136.01, 136.02, 136.07, 136.08, 296/136.1, 136.11, 136.12, 136.13, 139, 145; 135/87, 88.01, 88.05, 88.07; 150/166, 168
See application file for complete search history.

(56) References Cited

U.S. PATENT DOCUMENTS

| | | | | |
|---|---|---|---|---|
| 2,733,747 A | * | 2/1956 | Altschul | 150/166 |
| 4,531,560 A | * | 7/1985 | Balanky | 150/166 |
| 4,795,207 A | | 1/1989 | Clarke | |
| 4,807,922 A | * | 2/1989 | Glover | 296/136.02 |
| 4,856,842 A | * | 8/1989 | Ross et al. | 296/136.03 |
| 4,938,522 A | * | 7/1990 | Herron et al. | 296/136.1 |
| 4,940,276 A | * | 7/1990 | Madison | 296/136.11 |
| 4,973,100 A | * | 11/1990 | Yang | 296/136.04 |
| 5,086,988 A | * | 2/1992 | LaPoint et al. | 242/395 |
| 5,112,098 A | * | 5/1992 | Lichtmann | 296/136.07 |
| 5,209,545 A | * | 5/1993 | Slaugh | 296/136.07 |
| 5,364,155 A | * | 11/1994 | Kuwahara et al. | 296/136.04 |
| 5,368,912 A | | 11/1994 | Reaves | |
| 5,497,819 A | * | 3/1996 | Chiang | 150/166 |
| 5,605,369 A | | 2/1997 | Ruiz | |
| 5,791,361 A | * | 8/1998 | Chong | 135/88.01 |
| 5,845,958 A | * | 12/1998 | Rudys et al. | 296/136.08 |
| 5,855,406 A | * | 1/1999 | Vargo | 296/136.03 |

FOREIGN PATENT DOCUMENTS

| | | | | |
|---|---|---|---|---|
| GB | 2171375 A | * | 8/1986 | |
| JP | 60209326 | | 10/1985 | |

* cited by examiner

Primary Examiner—Patricia L. Engle

(57) ABSTRACT

A vehicle transport cover that protectively overlays the painted exterior surfaces of a vehicle. The cover includes a base sheet made of a moisture-resistant material that overlays the vehicle. An elastic strip that circumferentially extends along the vehicle encircling bottom edge of the base sheet holds the vehicle cover in place and ensures a tight fit over the vehicle. Openings provided in the base sheet and which overlay all of the vehicle windows are covered by transparent window sheets that promote driver visibility. A zippered slit is also provided in the cover along the base sheet region which is aligned over the driver-side door to allow easy access to and from the driver seat when the cover is arranged over the vehicle.

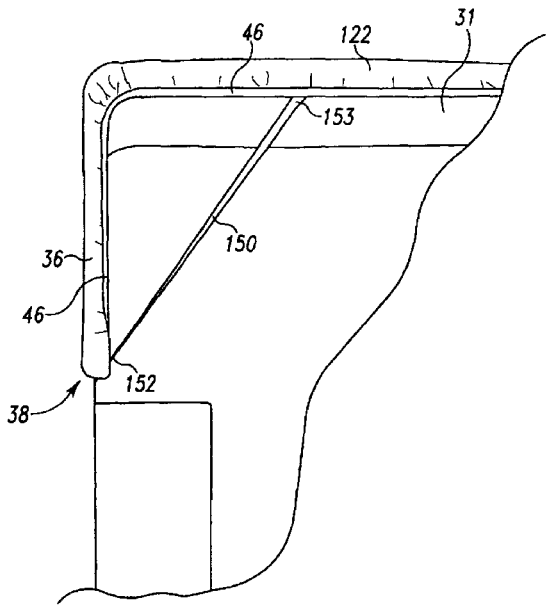

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–23 is confirmed.

* * * * *